Nov. 23, 1965  D. D. CHAPMAN ETAL  3,219,575
PROCESS OF DISPOSING OF HUMAN WASTE
Filed Jan. 16, 1961

RELATIONSHIP BETWEEN TEMPERATURE AND REACTION RATE

INVENTORS.
DAVID D. CHAPMAN
RICHARD H. BOGAN
BY
Reynolds & Christensen
ATTORNEYS

United States Patent Office 3,219,575
Patented Nov. 23, 1965

3,219,575
PROCESS OF DISPOSING OF HUMAN WASTE
David D. Chapman and Richard H. Bogan, Seattle, Wash., assignors to Boeing Airplane Company, Seattle, Wash., a corporation of Delaware
Filed Jan. 16, 1961, Ser. No. 82,968
1 Claim. (Cl. 210—7)

This invention is a result of study of the problem of disposal and use of human waste during long-term confinement within a closed space, as in a manned space vehicle. It has many other applications, however, such as on boats, house trailers, buses, manned space stations, and the like where economy of weight and space, or control of pollution are important. It can also be used in homes located where sewage as ordinarily disposed of might pollute streams or lakes. It will be described in relation to a space vehicle, but other possible uses must be kept in mind, and the claims construed to cover these uses, unless in terms restricted to a particular use.

Primarily the present invention provides rapid stabilization of human wastes (urine, feces) and is suitable for long-term use, especially in a vehicle where space available is small and low weight is highly important, for it provides adequate capacity in an exceedingly small space and in apparatus of little weight.

Such ends are attained by the use of a system wherein there is continuous flow of the waste and resultant products following their admission, as and when excreted; this is achieved, and the size of the system greatly reduced, by operation of the system at perhaps 300 times the normal waste concentration of ordinary domestic sewage, and by development of the proper microbiological population acclimated to such a high concentration.

Figure 1:
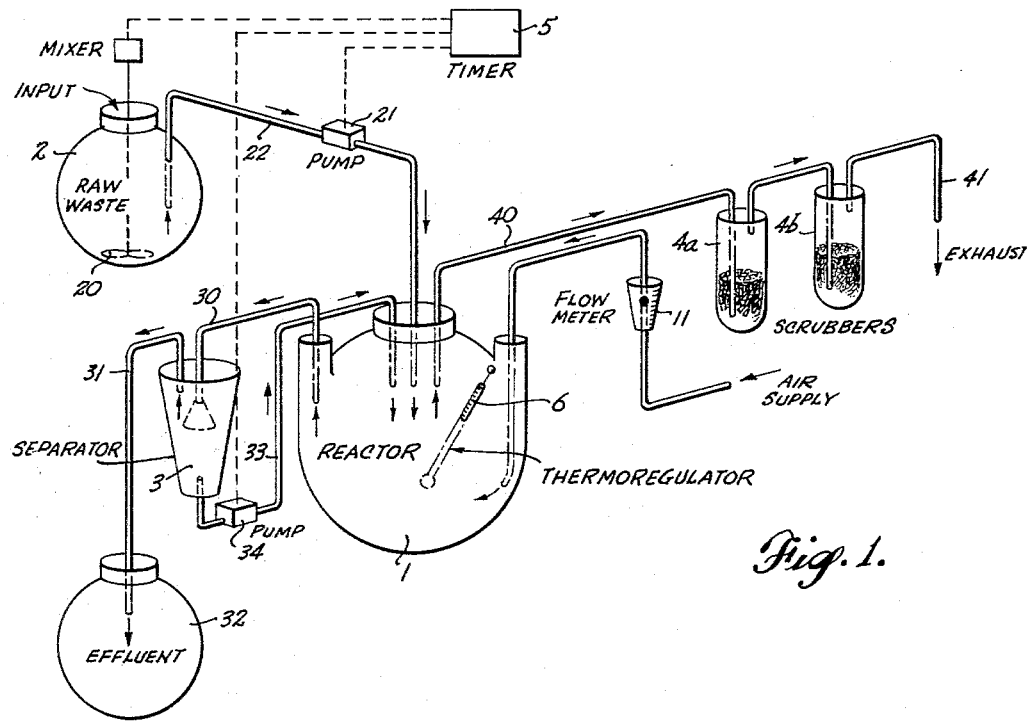
FIGURE 1 is a flow diagram of a plant such as will illustrate the present invention.

Heretofore human wastes in confined systems have either resulted in health hazards, from jettison or storage, for example, or have limited capacity, as in chemical treatment. The present invention produces microbiological degradation of the wastes, within the system, producing principally innocuous gaseous end products and cultures later used, the system having a very long useful life. About one quart of liquid effluent per person per day is an end product, which can easily be pasteurized during operation of the system or at any rate before jettisoning, stored for periodic disposal, or used for other components of the closed system such as algae production.

This invention is based upon the known activated sludge process, but differs from the known process in two important particulars, and others which will appear hereinafter, (a) the treatment of raw, undiluted wastes in a closed system by a continuous flow apparatus, and (b) the development of the proper microbiological population for use in such a system within the waste concentration range and at a throughput rate within the rather rapid range contemplated. By reason of these differences the plant may be kept sufficiently small in size and weight to serve in the environment suggested.

In essence waste matter is delivered to a reactor wherein it is vigorously aerated in the presence of natural microbiological populations to promote rapid growth of microbial cells to form an activated sludge. Raw human waste material has been found capable of supporting such populations, under proper conditions of temperature and adequate aeration, and since such waste material is three hundred times as concentrated as is found in a normal activated sludge system treating domestic sewage, this alone makes possible a high degree of miniaturization, so much so that a culture volume of only one-half cubic foot has been found adequate to handle the wastes of a four-man crew. If more space is available a lesser concentration can be employed. The microbiological population employed is one acclimated to the concentration, and such a population can be developed and acclimated to act upon and thrive in raw wastes.

The end products of such a system are carbon dioxide, ammonia, a liquid mineral-containing effluent of small volume, and a mass of cell tissue for further use in the system. The carbon dioxide and the effluent can probably be used in continuous-flow hydrophonics or in algae production, whereby nutritional values are derived; the cell mass also has been found to have significant nutritional qualities (although it is required in the continued operation of the system); the growth of pigs and chickens have been supplied directly thereby with adequate quantities of vitamin $B_{12}$, and the cell mass also contains all but the sulfur-containing essential amino acids. The present system gives promise of closing an ecological system whereby human wastes support plant life, and the plant life supplies oxygen and nourishment for human life that produces further wastes, all within a sufficiently small compass to be practical.

Figure 2:
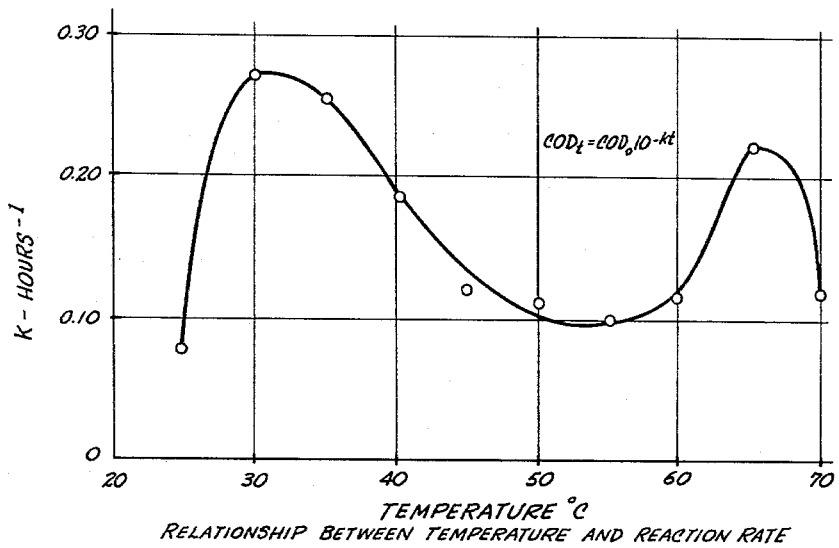
FIGURE 2 is a graph showing the relationship between temperature and reaction rate, using raw human wastes.

Temperature appears to be of primary importance in the development of the microbiological populations needed in the present system, and especially in determining the throughput rate. A normal temperature of about 35° C. with adequate aeration will produce a maximum reaction rate, as FIGURE 2 shows. The reaction constant for the peak at this temperature was 0.27, indicating that 90% of added oxidizable organic matter was oxidized in less than four hours, using a mesophilic culture. However, a second peak occurs at a temperature in the vicinity of 65° C. using a thermophilic culture. Thermophilic cultures tend to be self-pasteurizing, which is somewhat of an advantage. Either is contemplated for use in this system.

Not only temperature is important, but also waste composition and microbial population. The waste composition will remain rather constant with a relatively constant type of food input, and the microbial population is a result of natural selection and adjustment to environmental conditions, hence will tend to stabilize. It will, however, require building up from highly diluted wastes to, eventually, raw wastes. Some three weeks has been found adequate to the production of a microbial population which is self-sustaining in raw waste, given sufficient oxygen, of course.

At the outset of the studies whence this discovery is derived it was considered unlikely that an aerobic culture could be established on full strength waste material, which is 200 to 300 times as strong as ordinary domestic sewage. Such wastes were therefore initially highly diluted, but over a period of three weeks the quantity of waste matter fed was gradually increased until the cultures were receiving a one-third dilution of human waste matter, equivalent to a throughput rate of three days. It was found that the cultures were viable and active, especially at the temperature peaks noted in FIGURE 2. Indeed, only a few hours time served to oxidize the most of the raw waste added as produced, and a throughput rate of three days or more has proven entirely feasible. Some 97% to 98% of organic waste matter added is converted to $CO_2$ and $H_2O$ in approximately four days. Cell tissue will accumulate to a position of balance between new cell synthesis and destruction of old cells (endogenous respiration). Oxygen supply, either of oxygen per se or of air with say a 20% oxygen content is necessary, and this could become a limiting factor. Cell tissue might be subtracted from the system and kept active with oxygen, but preferably it is separated and recirculated through the reactor.

Pasteurization of plant pathogens in the effluent, or other method of sterilization thereof, may be necessary in a closed ecological system. Since the flow rate in a continuous-flow system is low, of the order of five milliliters per minute (for four men), sterilization presents no serious problem. As noted above, thermophilic cultures tend to be self-pasteurizing.

Water obtained by condensation from the enclosed space and from washing and other processes could be fed to the plant system directly, providing needed dilution to saline levels more usual in hydroponics. Water from the plant system then could be distilled for human use; residue from this distillation would contain some organics and considerable salts, from which could be derived sodium chloride for table use.

The system shown in FIGURE 1 comprises a reactor 1 wherein air (or oxygen, the terms being used synonymously) is supplied from an inlet 10, at a rate suitably controlled and consonant with the rate of oxidation required, a flow meter 11 being shown to regulate or indicate the supply rate. Temperature is maintained at optimum value by a regulator 6. Raw waste is received, usually in daily batches, in a receiver 2, wherein it is mixed by a mixer 20 to maintain its composition uniform and homogenous. It can be pumped by the pump 21 through conduit 22 to the reactor 1 at a controlled rate. Liquids are drawn from the reactor through conduit 30 into a separator 33, wherein they are separated, the liquid effluent passing off at 31 to a collector 32, and the sludge with its cultures returning to the reactor by a conduit 33 and pump 34. These cultures are necessary to supply enough acclimated microbial population to maintain the system operational. Gaseous end products from the reactor, largely carbon dioxide, leave by way of conduit 40 and may pass through scrubbers 4a and 4b, where ammonia and carbon dioxide are removed, and are exhausted at 41, either externally of the cabin space, or the $CO_2$ may serve for use in sustaining plant life. A timer 5 controls operation of the mixer 20, and the pumps 34 and 21. Pumping rates are adjusted to maintain good settling performance and to limit the time the sludge is away from air. Since some liquid effluent is withdrawn to collector 32, an equivalent volume of water or like liquid should be added to the system daily to maintain constant volume within the system. Provision may be made for recycling air through the reactor, if desired.

It has been determined that a plant adequate for conversion of up to 97% or 98% of the entire waste of a fourman crew can be effected in a throughput period of three days within a system requiring a volume of culture of some 18 liters, or little over one-half of one cubic foot, and in a total plant volume of perhaps three cubic feet.

We claim as our invention:

A process of disposing of human waste which comprises establishing a closed circulation of liquid waste between a reactor and a separator, and back to the reactor, in which the reactor is initially charged with a mass of human waste having a liquid dilution commensurate with that of ordinary domestic sewage, oxygen is supplied continuously to the reactor and over a period of time human waste having successively reduced liquid dilution is added to the reactor to produce an activated sludge, admitting to the closed circulation at a generally constant rate raw human waste, and continuously returning to the closed circulation activated sludge from the separator.

References Cited by the Examiner

UNITED STATES PATENTS 2,987,186   6/1961   Burgoon et al. _____ 210—15 X

FOREIGN PATENTS 228,637   6/1950   Australia.

OTHER REFERENCES

"Activated Sludge Total Oxidation Metabolism"— Forney et al., Proc. 13th Ind. Waste Conf., Purdue Univ. (1958) pp. 313–320.

"The Biological Control of Enclosed Environments"— Golueke et al., Sewage and Industrial Wastes, vol. 31, Oct. 1959 pp. 1125–1142.

The Influence of Temperature on Biological Sewage Treatment, Viehl, Sewage Works J., vol. 8, July 1936, pp. 690–691.

"Total Oxidation of Organic Wastes"—Tapleshay, Sewage and Industrial Wastes, vol. 30, May 1958, pp. 652–661.

MORRIS O. WOLK, *Primary Examiner.*

CARL F. KRAFFT, *Examiner.*